Aug. 27, 1968    R. APOTHÉLOZ    3,398,639
HOLDING DEVICE FOR A ROCKET IN A LAUNCHER TUBE
Filed Oct. 4, 1966
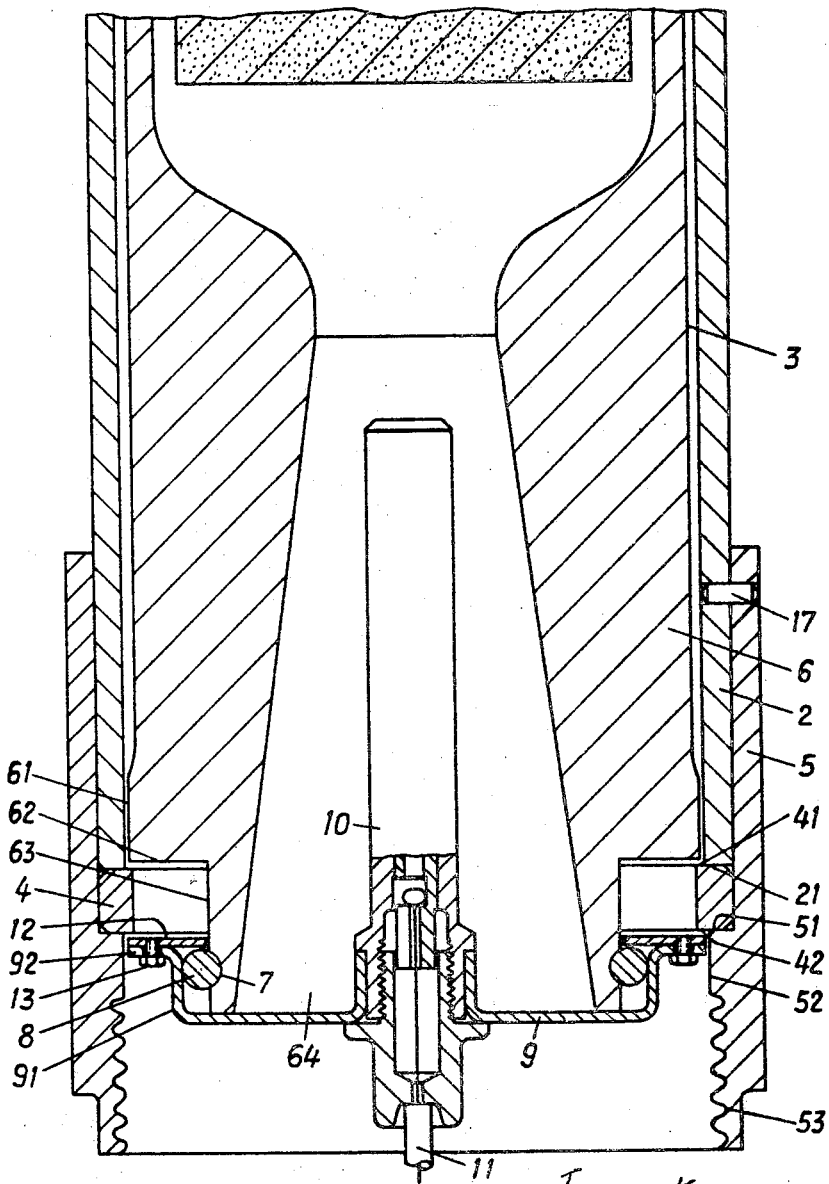
Inventor
Robert Apothéloz
By
Wenderoth, Lind & Ponack
Attorneys

United States Patent Office 3,398,639
Patented Aug. 27, 1968

3,398,639
HOLDING DEVICE FOR A ROCKET IN A LAUNCHER TUBE
Robert Apothéloz, Wallisellen, Switzerland, assignor to Oerlikon-Buhrle Holding Ltd., Zurich, Switzerland
Filed Oct. 4, 1966, Ser. No. 584,162
Claims priority, application Switzerland, Oct. 6, 1965, 13,792/65
2 Claims. (Cl. 89—1.806)

ABSTRACT OF THE DISCLOSURE

A rocket launcher having a tube with a stop surface containing a rocket with an outer surface. A driving nozzle for the rocket and a device for securing the rocket in the launcher tube. A cap having a rest position covers the nozzle. A thrust member is constructed as an annular disc with breaking elements releasably connecting the cap with the thrust member. The cap, under the influence of the gases emerging from the nozzle on discharge of the rocket is movable in a direction opposite the intended direction of flight of the rocket. A locking element forms a stop for the thrust member and a groove is provided in the outer surface of the rocket. The locking element in the rest position of said cap, is held by said cap in engagement with the groove and on movement of said cap from rest position, is released from said groove so that the thrust member acts together with the stop surface arranged on said launcher tube and the stop surface, in the rest position of the cap prevents movement of the cap in a direction opposite to the direction of flight, without rupture of the breaking elements.

---

This invention relates to a holding device for a rocket in a launcher tube.

An object of the invention is a construction which is provided with a cap which, in a rest position, covers the driving nozzle of the rocket, and which, under the influence of the gases emerging from the nozzle on discharge of the rocket, is slidable in a direction opposite to the direction of flight and against the resistance of holding components, and which furthermore has locking elements which, in the rest position of the cap, are held by the latter in engagement with recesses provided in the surface of the rocket but on the cap sliding out of the rest position, are released from the latter.

With a known holding device of this kind, the means of holding consist of springs secured at one end to the launcher tube. Furthermore, the locking elements engage, in the rest position of the cap, in notches in the wall of the launcher tube and thereby lock the rocket against sliding in relation to the launcher tube. This has the result that the thrust developed by the rocket on discharge is transmitted to the latter in a forward direction through the locking elements, and through the cap and the springs to the rear. As, however, the cap slides to the rear, this force directed to the rear only acts on the launcher tube with delay compared to the first-mentioned forward-directed force. At the moment of discharge, the launcher tube therefore is under the influence of a forward-directed force. This application of load to the launcher tube is in many cases undesirable, particularly, if the launcher tube, with the frame carrying it, are of light construction, in which case both can be broken down by small forces. Lightly built launching devices of this kind are primarily those which, together with the supporting frame, represent expendable equipment, that is such as do not come into reuse and hence are made with economy of material, such, for example, as the discharge devices used to fire light rockets to greater ranges.

A further object of the invention, is to produce a holding device which releases the rocket on launching, without the disturbing force mentioned being transmitted to the launcher tube. In accordance with the invention, the cap, by means of the holding components constructed as breaking elements, is releasably connected to a thrust member which, for its locking against sliding in the direction of flight, is constructed with a counter-stop, acting together with a stop arranged on the launcher tube, and for which the locking elements located inside the launcher tube form a further stop, which prevents sliding of the cap in a direction opposite to the direction of flight.

A preferred embodiment of the invention is shown in the drawing which illustrates in longitudinal section the rear portion of a rocket held ready to fire in a launcher tube.

As shown in the drawing, a ring 4, made with the same external diameter as the launcher tube, is supported on the inside rear face 21 of the launcher tube 2 and rests on a shoulder 51 of a sleeve 5, fitted over the rear end of the tube 2 and rigidly connected to it with a pin 17. The interior diameter of the ring 4 is a little less than that of the tube 2 and that of the cylindrical surface 52 of the sleeve 5 extending to the rear of the shoulder 51. The ring-shaped surfaces of the ring 4 projecting inside the tube are marked 41 and 42.

A cap (not shown) can be screwed on to the thread 53 cut in the sleeve 5, for storage and transport, whereby the tube 2 forms a container, which contains the rocket 3.

In the rear of the surface 61, serving as a guide in the tube 2, the nozzle body 6 of the rocket has a shoulder 62, at right angles to the axis, which extends to its rear end 63, made with a smaller diameter. On the circumference of this rear end 63, a groove 7 is cut, in which engages a split spring ring 8, forming a locking element, the inside diameter of which in the relaxed state is greater than that of the nozzle body end 63 containing the groove 7; the depth of this groove is in this case smaller than the radius of the boundary surface of the spring ring.

The spring ring 8 is held under radial pressure by a collar-like projection 91 of a cap 9 closing the nozzle end 64 and is thereby held in engagement with the groove 7. The ignition device 10 of the rocket propellant charge, which can be actuated by the Bowden cable 11, is connected to the cap 9. The edge flange 92, at right angles to the nozzle axis, of the collar 91 abuts against a thrust member or shrouding ring 12, surrounding the nozzle body end 63 in front of the spring ring 8, and the spring ring 8 forms a stop for the rear side of the ring 12. The shrouding ring 12 and the collar edge flange 92 of the cap 9 have at their points of connection breaker screws 13, which form predetermined breaking points and are arranged on a diameter which is greater than the outside diameter of the spring ring 8. The shrouding ring 12, the outside diameter of which is greater than the inside diameter of the thrust ring 4, is arranged behind the latter.

The holding device operates as follows from the construction described.

During transport and before firing, the rocket 3 is held rigidly by the ring 4 in the tube 2, since the surfaces 41 and 42 form stops for the shoulder 62 of the nozzle body 6 and for the shrouding ring 12.

The axially directed forces exerted, after ignition of the rocket propellant charge, by the gas on the one hand on the rocket 3, and from the latter on the spring ring 8 and the shrouding ring 12, and on the other hand on the cap 9, are, up to the attainment of a certain pressure in the rocket combustion chamber, equal and opposite, so that the rocket remains at rest, without these forces acting on the launcher tube. After that pressure is exceeded, the breaker screws 13 are broken, whereupon the cap 9 is forced to the rear and its collar 91 slips off the spring ring 8.

As soon as the spring ring 8 is no longer under the influence of these radially acting compressive forces of the collar 91, it relaxes and opens. This opening process is further assisted by the forces transmitted to the spring ring 8, at the start of the movement of the rocket, by the shrouding ring 12 and by the area of contact with the groove 7. Under the effect of these two forces, the spring ring is forced out of the groove 7 over its entire circumference and stripped off the nozzle body end 63, so that the rocket 3 is now free. As the mass of the spring ring 8 is only very small, the force transmitted to the tube 2, on its being stripped off, is also very small, so that it can in no way cause a disturbance.

The screws 13, connecting the shrouding ring 12 with the edge flange 92 of the cap 9, are not stressed or strained by the forces which arise from shocks or vibration when the rocket is transported. They therefore do not form a factor of uncertainty in the holding device and can be dimensioned specifically for their proper function.

I claim:

1. In a rocket launcher having a tube with a stop surface, a rocket with an outer surface, a driving nozzle of the rocket, a device for securing the rocket in the launcher tube, the combination comprising a cap having a rest position, a thrust member constructed as an annular disc, breaking elements releasably connecting said cap with said thrust member, said cap, under the influence of the gases emerging from the nozzle on discharge of the rocket being movable in a direction opposite the intended direction of flight of the rocket, a locking element forming a stop for said thrust member, a groove in the outer surface of said rocket, said locking element in the rest position of said cap, being held by said cap in engagement with said groove and on movement of said cap from rest position, being released from said groove so that said thrust member acts together with said stop surface arranged on said launcher tube and said stop surface, in the rest position of said cap prevents movement of said cap in a direction opposite to said direction of flight, without rupture of said breaking elements.

2. In a rocket launcher device with a projector extending along an axis provided with an impact surface and with a rocket, having a nozzle for the exit of driving gases, said nozzle being provided with an exterior casing surface, a holding device to keep said rocket in the projector arranged detachable from said rocket, said holding device comprising a supporting element displaceable on said casing surface arranged behind said impact surface and cooperating with said impact surface, for the support of the holding device against axial forward movements of the holding device relative to the projector, a cap arranged behind said supporting element having a rest position, said cap in its rest position covering said nozzle for forming a gas pressure within said nozzle, and onto which cap by said gas pressure a loosening movement towards the opening of the nozzle can be transmitted relatively towards the nozzle towards the rear, safety means arranged behind said support member having a locking position, said safety means in said locking position securing said supporting member against axial rearward displacement relative to said casing surface and said safety means in the rest position of said cap being kept in the locking position by said cap and at a loosening movement of said cap being released for leaving said locking position whereby said support element and thrust element connecting said cap prevent a displacement of said cap from its rest position before the formation of a gas pressure in the nozzle.

References Cited

UNITED STATES PATENTS

| 2,925,011 | 2/1960 | Musser et al. | 89—1 |
| 3,059,541 | 10/1962 | Martinoli et al. | 89—1.806 |

FOREIGN PATENTS

| 1,340,562 | 9/1963 | France. | |

SAMUEL W. ENGLE, *Primary Examiner.*